(12) United States Patent
Takei et al.

(10) Patent No.: US 12,466,392 B2
(45) Date of Patent: Nov. 11, 2025

(54) VEHICLE CONTROL METHOD AND VEHICLE CONTROL DEVICE

(71) Applicant: Nissan Motor Co., Ltd., Yokohama (JP)

(72) Inventors: Daisuke Takei, Kanagawa (JP); Shinya Saito, Kanagawa (JP); Yuta Akamatsu, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 18/707,735

(22) PCT Filed: Nov. 17, 2021

(86) PCT No.: PCT/JP2021/042282
§ 371 (c)(1),
(2) Date: May 6, 2024

(87) PCT Pub. No.: WO2023/089701
PCT Pub. Date: May 25, 2023

(65) Prior Publication Data
US 2025/0010844 A1    Jan. 9, 2025

(51) Int. Cl.
*B60W 30/02* (2012.01)
*B60W 30/18* (2012.01)
*B60W 60/00* (2020.01)

(52) U.S. Cl.
CPC ...... *B60W 30/02* (2013.01); *B60W 30/18163* (2013.01); *B60W 60/001* (2020.02); *B60W 2420/403* (2013.01); *B60W 2552/53* (2020.02)

(58) Field of Classification Search
CPC .............. G06V 20/588; B60W 30/12; B60W 2552/53; B60W 10/20; B60W 2540/18; B62D 15/0255; B60T 2201/08
See application file for complete search history.

(56) References Cited

U.S. PATENT DOCUMENTS

| 10,814,908 B2 | 10/2020 | Isomoto et al. |
| 2018/0273089 A1 | 9/2018 | Isomoto et al. |

(Continued)

FOREIGN PATENT DOCUMENTS

| JP | 2017-030396 A | 2/2017 |
| JP | 2017-091285 A | 5/2017 |

(Continued)

*Primary Examiner* — Kenneth J Malkowski
(74) *Attorney, Agent, or Firm* — Young Basile Hanlon & MacFarlane, P.C.

(57) ABSTRACT

A controller executes processing including: before a lane change of an own vehicle to an adjacent lane by autonomous driving is started, acquiring lane marking information in front of the own vehicle and first lane width information from a camera and controlling a yaw angle of the own vehicle, based on the lane marking information and the first lane width information so the own vehicle travels within an own vehicle lane; when the lane change is started, acquiring second lane width information from map information and controlling the yaw angle, based on the second lane width information in such a way that the own vehicle performs the lane change; and after the lane change is completed, controlling the yaw angle, based on the lane marking information and the first lane width information in such a way that the own vehicle travels within an own vehicle lane after lane change.

6 Claims, 5 Drawing Sheets

(56) References Cited

U.S. PATENT DOCUMENTS

| | | | | |
|---|---|---|---|---|
| 2018/0297639 A1* | 10/2018 | Fujii | ............. | G05D 1/0246 |
| 2019/0005823 A1* | 1/2019 | Fujiki | ............. | B62D 6/001 |
| 2019/0071094 A1 | 3/2019 | Nishiguchi et al. | | |
| 2019/0308623 A1* | 10/2019 | Sato | ............. | G06V 20/588 |
| 2020/0285863 A1 | 9/2020 | Sadjadi et al. | | |
| 2022/0219692 A1* | 7/2022 | Taniguchi | ............. | B60W 30/12 |

FOREIGN PATENT DOCUMENTS

| | | | |
|---|---|---|---|
| JP | 2017-144934 A | 8/2017 | |
| JP | 2019-043378 A | 3/2019 | |
| JP | 2020-032828 A | 3/2020 | |
| WO | WO-2020230551 A1 * | 11/2020 | ............. B60W 30/12 |

* cited by examiner

VEHICLE CONTROL METHOD AND VEHICLE CONTROL DEVICE

TECHNICAL FIELD

The present invention relates to a vehicle control method and vehicle control device.

BACKGROUND

In JP 2019-043378 A described below, a vehicle control system that controls lane change of a vehicle, based on a position of a lane marking recognized from a captured image captured by a camera is described.

SUMMARY

However, a lane marking is sometimes falsely recognized in a captured image captured by a camera. When false recognition of a lane marking occurs during lane change by autonomous driving, appropriate control of lane change sometimes becomes difficult to perform. For example, a vehicle behavior that a passenger does not intend sometimes occurs.

An object of the present invention is to reduce influence that false recognition of a lane marking by a camera gives to lane change by autonomous driving.

According to an aspect of the present invention, there is provided a vehicle control method causing a controller to execute processing including: before a lane change of an own vehicle to an adjacent lane by autonomous driving is started, acquiring lane marking information in front of the own vehicle and first lane width information, the first lane width information being information about lane width, from a camera and controlling a yaw angle of the own vehicle, based on the lane marking information and the first lane width information in such a way that the own vehicle travels within an own vehicle lane; when the lane change is started, acquiring second lane width information, the second lane width information being information about lane width, from map information and controlling the yaw angle, based on the second lane width information in such a way that the own vehicle performs the lane change; and after the lane change is completed, controlling the yaw angle, based on the lane marking information and the first lane width information in such a way that the own vehicle travels within an own vehicle lane after lane change.

According to an aspect of the present invention, it is possible to reduce influence that false recognition of a lane marking by a camera gives to lane change by autonomous driving.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION (Configuration)

Figure 1:
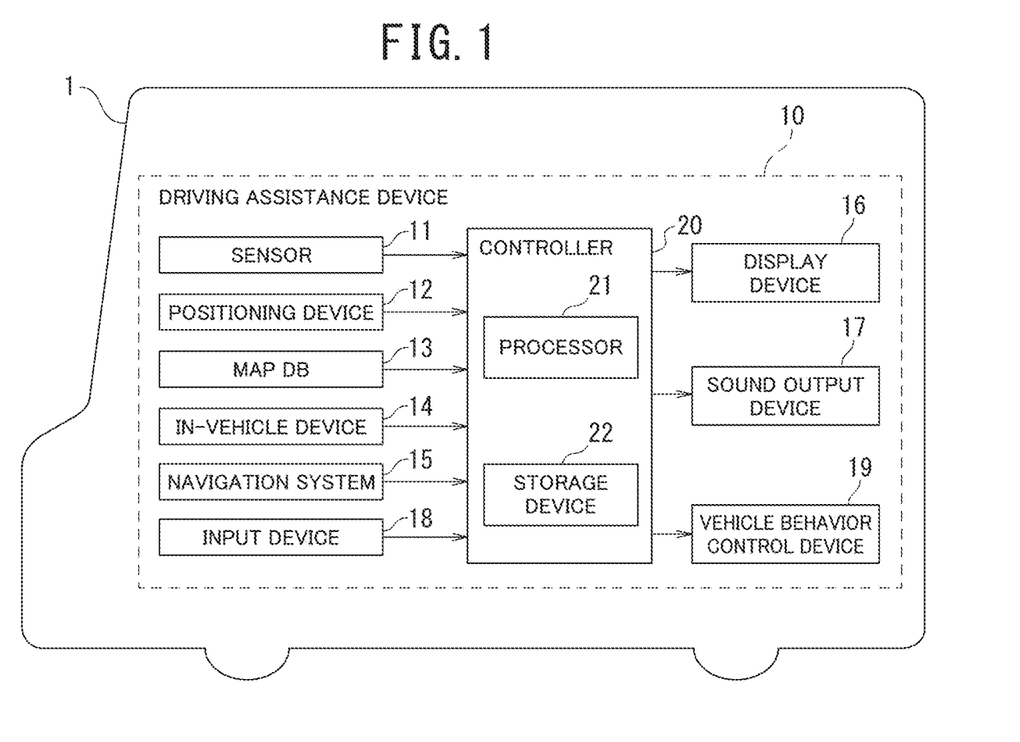
FIG. 1 is a diagram illustrative of an example of a schematic configuration of a vehicle on which a driving assistance device of an embodiment is mounted.

FIG. 1 is a diagram illustrative of an example of a schematic configuration of a vehicle on which a driving assistance device of an embodiment is mounted. A driving assistance device 10 mounted on an own vehicle 1 includes a sensor 11, a positioning device 12, a map database (map DB) 13, an in-vehicle device 14, a navigation system 15, a display device 16, a sound output device 17, an input device 18, a vehicle behavior control device 19, and a controller 20. The above-described devices are connected to one another via, for example, a controller area network (CAN) or another in-vehicle LAN in order to perform transmission and reception of information with one another. Note that the driving assistance device 10 is an example of a "vehicle control device" described in the claims.

The sensor 11 detects a travel state of the own vehicle 1. For example, the sensor 11 includes cameras, such as a front view camera for capturing a front view of the own vehicle 1, a rear view camera for capturing a rear view of the own vehicle 1, and side view cameras for capturing right and left side views of the own vehicle 1. In addition, the sensor 11 includes radars, such as a front view radar for detecting an obstacle in front of the own vehicle 1, a rear view radar for detecting an obstacle in the rear of the own vehicle 1, and side view radars for detecting an obstacle existing on the right and left lateral sides of the own vehicle 1. Further, the sensor 11 includes a vehicle speed sensor or the like that detects vehicle speed of the own vehicle 1.

The positioning device 12 includes a GPS unit, a gyro sensor, a vehicle speed sensor, and the like. The positioning device 12 detects radio waves transmitted from a plurality of communication satellites by the GPS unit and periodically acquires position information of the own vehicle 1. In addition, the positioning device 12 detects a current position of the own vehicle 1, based on acquired position information of the own vehicle 1, angle change information acquired from the gyro sensor, and vehicle speed acquired from the vehicle speed sensor.

The map database 13 is a memory that stores three-dimensional high-definition map information including position information of various types of facilities and specific points and is configured to be accessible from the controller 20. The three-dimensional high-definition map information includes information in units of lanes that is more precise than information in units of roads. For example, the three-dimensional high-definition map information includes, as information in units of lanes, information of lane nodes that indicate reference points on a lane reference line (for example, a lane center line) and information of lane links that indicate forms of lane sections between lane nodes. Information of each lane node includes position coordinates of the lane node, the number of connected lane links, and information about connected lane links. Information of each lane link includes lane width (width) of the lane, a type of a lane boundary line, a shape of the lane, a shape of a lane marking, and a shape of a lane reference line.

The in-vehicle device 14 is various types of devices mounted on the own vehicle 1 and operates in accordance with an operation by a passenger. Examples of such an in-vehicle device include a steering wheel, an accelerator pedal, a brake pedal, turn signals, windshield wipers, lights, a horn, other specific switches, and the like.

The navigation system 15 acquires current position information of the own vehicle 1 from the positioning device 12 and, by superimposing the position of the own vehicle 1 on map information for navigation, displays the current position on a display or the like. In addition, the navigation system 15 includes a navigation function to, when a destination is set, set a route to the destination and guide the passenger along the set route.

The display device 16 includes, for example, a display that the navigation system 15 includes, a display incorporated in a rearview mirror, a display incorporated in a meter section, a head-up display projected on a windshield, and the like. The display device 16 notifies the passenger of various types of presented information in accordance with control by the controller 20.

The sound output device 17 is a device to output acoustic information, such as a speaker that the navigation system 15 includes, a speaker of an audio device, and a buzzer. The sound output device 17 notifies the passenger of various types of presented information in accordance with control by the controller 20.

The input device 18 is a device, such as a button switch that enables the passenger to input an operation by manual operation, a touch panel arranged on a display screen, and a microphone that enables the passenger to input an operation by voice. The passenger, by operating the input device 18, is able to input setting information in response to presented information presented by the display device 16 and the sound output device 17.

Figure 2:
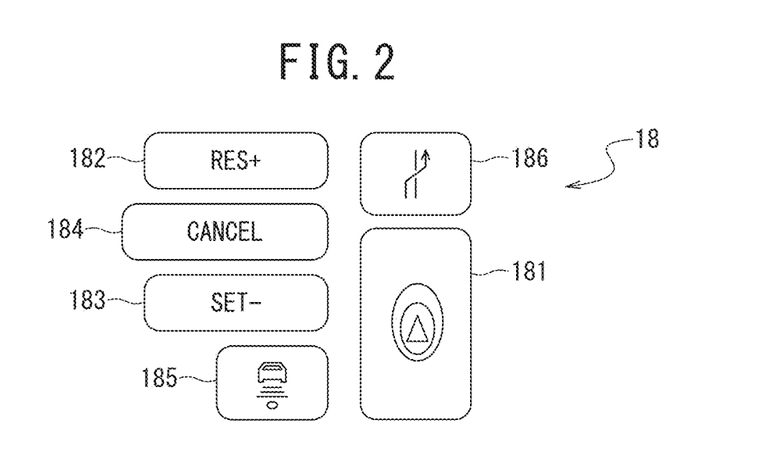
FIG. 2 is a diagram illustrative of a portion of an input device in FIG. 1.

FIG. 2 is a diagram illustrative of a portion of the input device 18 of the present embodiment. The input device 18 may be a button switch group that is arranged on, for example, a spoke of the steering wheel. The input device 18 is used when turning on and off and the like of an autonomous travel control function that the controller 20 includes are set. The input device 18 includes a main switch 181, a resume/accelerate switch 182, a set/coast switch 183, a cancel switch 184, an inter-vehicle distance adjustment switch 185, and a lane change assistance switch 186.

The main switch 181 is a switch to turn on and off the autonomous travel control function of the controller 20. The resume/accelerate switch 182 is a switch to, after turning off the autonomous travel control function, set resumption of the autonomous travel control function at a set speed before the turning-off of the autonomous travel control function or to increase the set speed. The set/coast switch 183 is a switch to start the autonomous travel control function. In order to start the autonomous travel control function, after the autonomous travel control function is turned on by the main switch 181, the set/coast switch 183 is pressed. The set/coast switch 183 is also a switch to decrease the set speed. The cancel switch 184 is a switch to cancel the autonomous travel control function. The inter-vehicle distance adjustment switch 185 is a switch to set an inter-vehicle distance to a preceding vehicle. The lane change assistance switch 186 is a switch to, when the controller 20 confirms start of a lane change to the passenger, instruct (accept) the start of the lane change.

Note that, in addition to the button switch group illustrated in FIG. 2, a turn signal lever for the turn signals and another switch in the in-vehicle device 14 can be used as the input device 18. For example, when the passenger operates the turn signal lever in the case where whether or not a lane change is performed in an automated manner is proposed by the controller 20, a lane change in a direction in which the turn signal lever is operated is performed instead of the proposed lane change.

The vehicle behavior control device 19 controls vehicle behavior of the own vehicle 1. For example, when the own vehicle 1 performs constant speed travel at a set speed by the autonomous travel control function, the vehicle behavior control device 19 controls operation of a drive mechanism and brake operation to achieve acceleration/deceleration and travel speed that enable the own vehicle 1 to travel at the set speed. In addition, when the own vehicle 1 travels following a preceding vehicle by the autonomous travel control function, the vehicle behavior control device 19 also likewise controls the operation of the drive mechanism and the brake. Note that the operation control of the drive mechanism includes operation of an internal-combustion engine in the case of an engine-driven vehicle and operation of a motor for traveling in the case of an electric vehicle. In addition, the operation control of the drive mechanism includes torque distribution between an internal-combustion engine and a motor for traveling in the case of a hybrid vehicle.

In addition, when the vehicle behavior control device 19 performs lane-keeping control, a lane change assistance function, or a passing assistance function, which will be described later, by the autonomous travel control function, the vehicle behavior control device 19 performs, in addition to the operation control of the drive mechanism and the brake, steering control of the own vehicle 1 by controlling operation of a steering actuator and thereby controls direction (that is, an attitude and a yaw angle) of a vehicle body of the own vehicle 1. Note that in place of or in addition to steering control to, by controlling a steering angle to a set target steering angle, control the direction of the vehicle body and move a lateral position of the own vehicle 1, the direction of the vehicle body (that is, the attitude and the yaw angle) of the own vehicle 1 may be controlled by controlling a difference between wheel speeds of a right wheel and a left wheel of the own vehicle 1 and the lateral position of the own vehicle 1 may be thereby moved.

The controller 20 is one or a plurality of electronic control units for controlling travel of the own vehicle 1 and includes a processor 21 and peripheral components, such as a storage device 22. The processor 21 may be, for example, a CPU or an MPU. The storage device 22 may include a semiconductor storage device, a magnetic storage device, an optical storage device, and the like. The storage device 22 may include registers, a cache memory, and a memory, such as a ROM or a RAM, that is used as a main storage device. Functions of the controller 20, which will be described below, are achieved by, for example, the processor 21 executing computer programs stored in the storage device 22.

Note that the controller 20 may be formed using dedicated hardware for performing various types of information processing that will be described below. For example, the controller 20 may include a functional logic circuit that is implemented in a general-purpose semiconductor integrated circuit. For example, the controller 20 may include a programmable logic device, such as a field-programmable gate array, and the like.

The controller 20 achieves a travel information acquisition function to acquire information relating to a travel state of the own vehicle 1 and an autonomous travel control function to autonomously control travel speed and/or steering of the own vehicle 1. The travel information acquisition function of the controller 20 is a function to acquire travel information relating to a travel state of the own vehicle 1. For example, the controller 20 may acquire, as the travel information, image information of the outside of the vehicle captured by the front view camera, the rear view camera, and the side view cameras in the sensor 11. In addition, the controller 20 acquires, as the travel information, detection results by the front view radar, the rear view radar, and the side view radars. Further, the controller 20 also acquires, as the travel information, vehicle speed information of the own vehicle 1 detected by the vehicle speed sensor in the sensor 11 and image information of the face of the passenger captured by the in-vehicle camera.

Further, the controller 20 acquires, as the travel information, the current position information of the own vehicle 1 from the positioning device 12. In addition, the controller 20 acquires, as the travel information, a set destination and a route to the destination from the navigation system 15. Further, the controller 20 acquires, as the travel information, the three-dimensional high-definition map information from the map database 13. Moreover, the controller 20 acquires, as the travel information, information about operation of the in-vehicle device 14 by the passenger from the in-vehicle device 14.

The autonomous travel control function of the controller 20 is a function to autonomously control travel of the own vehicle 1 without depending on operation by the passenger. The autonomous travel control function of the controller 20 include an autonomous speed control function to autonomously control travel speed of the own vehicle 1 and an autonomous steering control function to autonomously control steering of the own vehicle 1. The autonomous speed control function and the autonomous steering control function of the present embodiment will be described below.

<Autonomous Speed Control Function>

The autonomous speed control function is a function to, when a preceding vehicle is detected, control the own vehicle 1 to travel following the preceding vehicle while performing inter-vehicle distance control in such a way as to keep an inter-vehicle distance matching vehicle speed with a vehicle speed set by the passenger used as an upper limit. In contrast, when no preceding vehicle is detected, the autonomous speed control function controls the own vehicle 1 to perform constant speed travel at a vehicle speed set by the passenger. The former and the latter are also referred to as inter-vehicle distance control and constant speed control, respectively.

The constant speed control is performed when it is detected by the front view radar or the like in the sensor 11 that no preceding vehicle exists ahead in an own vehicle lane. In the constant speed control, the vehicle behavior control device 19 controls operation of the drive mechanism, such as the engine and the brake, while feeding back vehicle speed data detected by the vehicle speed sensor in such a manner as to maintain the set travel speed.

The inter-vehicle distance control is performed when it is detected by the front view radar or the like in the sensor 11 that a preceding vehicle exists ahead in the own vehicle lane. In the inter-vehicle distance control, the vehicle behavior control device 19 controls operation of the drive mechanism, such as the engine and the brake, while feeding back inter-vehicle distance data detected by the front view radar in such a manner as to maintain set inter-vehicle distance with the set travel speed used as an upper limit.

<Autonomous Steering Control Function>

The autonomous steering control function is a function to perform the steering control of the own vehicle 1 by controlling operation of the steering actuator.

The autonomous steering control function includes, for example, the lane-keeping function, the lane change assistance function, and the passing assistance function.

The lane-keeping function is a function to assist steering of the passenger by, for example, controlling the steering actuator (that is, performing steering control of the own vehicle 1) in such a way that the own vehicle 1 travels at a predetermined lateral position in the own vehicle lane (for example, substantially the center of the lane). Hereinafter, control of the lateral position of the own vehicle 1 by the lane-keeping function is sometimes referred to as "lane-keeping control".

When the set/coast switch 183 is pressed after the autonomous travel control function is turned on by the main switch 181, the controller 20 determines whether or not a predetermined autonomous travel control start condition is established. When the controller 20 determines that the autonomous travel control start condition is established, the controller 20 performs the lane-keeping function in the autonomous steering control function.

Alternatively, when the autonomous travel control start condition is established after the autonomous travel control function is turned on by the main switch 181, the controller 20 waits for the set/coast switch 183 to be pressed. When the set/coast switch 183 is pressed, the controller 20 starts the autonomous travel control and performs the lane-keeping function in the autonomous steering control function.

<Lane Change Assistance Function>

The lane change assistance function turns on a turn signal when the passenger operates the turn signal lever and starts lane change control that is a series of processing for automated lane change when a predetermined lane change start condition is satisfied. The lane change assistance function determines whether or not the predetermined lane change start condition is established, based on various types of travel information acquired by the travel information acquisition function.

The lane change assistance function starts the lane change control when the lane change start condition is satisfied. The lane change control causes the own vehicle 1 to laterally move to an adjacent lane and, when the movement to the adjacent lane is completed, turns off the turn signal and starts performance of the lane-keeping function in the adjacent lane.

<Passing Assistance Function>

When a preceding vehicle that is slower than the own vehicle 1 exists ahead in the own vehicle lane and a predetermined passing proposition condition is satisfied, the passing assistance function presents passing information to the passenger by the display device 16. In this configuration, the passing information is information for proposing passing the preceding vehicle to the passenger. The passing assistance function turns on a turn signal and starts the lane change control when the passenger accepts the passing by operating the lane change assistance switch 186 in the input device 18 in response to the presentation of the passing information and a preset passing start condition is satisfied. The passing assistance function determines whether or not the passing proposition condition and the passing start condition are established, based on various types of travel information acquired by the travel information acquisition function.

The lane change control causes the own vehicle 1 to laterally move to an adjacent lane and, when the movement to the adjacent lane is completed, turns off the turn signal and starts performance of the lane-keeping function in the adjacent lane.

In addition, when after the own vehicle 1 passes the preceding vehicle, the passing proposition condition is satisfied again, the passing assistance function proposes returning to the original lane to a driver by the display device 16. When the driver accepts the proposal by operating the lane change assistance switch 186 in the input device 18 and the passing start condition is satisfied, the passing assistance function starts the lane change control in such a way as to cause the own vehicle to return to the original lane. When the movement to the original lane is completed, the passing assistance function turns off the turn signal and starts performance of the lane-keeping function in the original lane.

Figure 3:
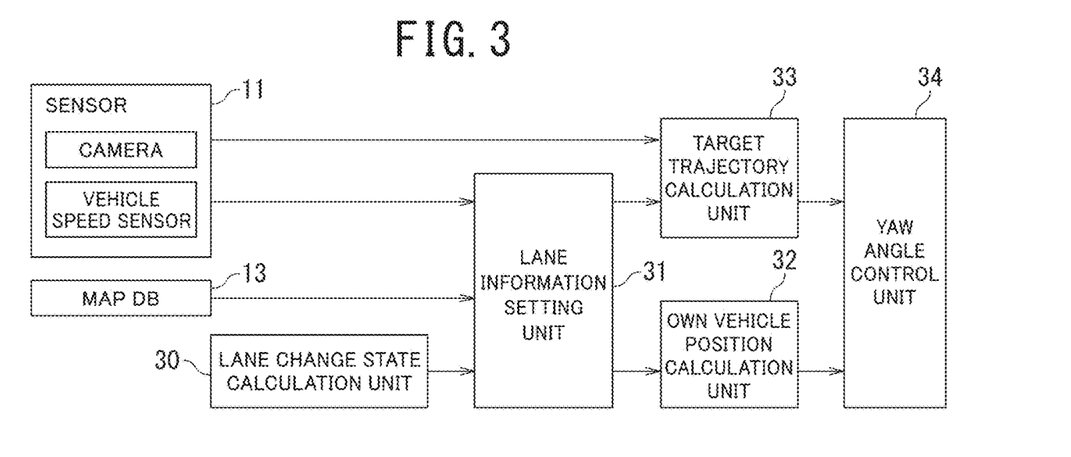
FIG. 3 is a block diagram of an example of a functional configuration that performs lane-keeping control and lane change control in a controller.

Next, the lane-keeping control and the lane change control by the autonomous steering control function will be described. Note that herein, in the description of the lane change control, a case where the own vehicle 1 performs a lane change from a first lane Le to a second lane Ln that is an adjacent lane to the first lane Le will be described as an example (see FIG. 4). FIG. 3 is a block diagram of an example of a functional configuration for performing the lane-keeping control and the lane change control in the controller 20. The controller 20 includes a lane change state calculation unit 30, a lane information setting unit 31, an own vehicle position calculation unit 32, a target trajectory calculation unit 33, and a yaw angle control unit 34.

The lane change state calculation unit 30 determines whether or not to start a lane change of the own vehicle 1. For example, the lane change state calculation unit 30 determines whether or not a condition to start the lane change control is established in the autonomous steering control function, such as the lane change assistance function and the passing assistance function. For example, the lane change state calculation unit 30 determines whether or not the lane change start condition is established in the lane change assistance function. In addition, for example, the lane change state calculation unit 30 determines whether or not the passing start condition is established in the passing assistance function. When the above-described conditions are satisfied, the lane change state calculation unit 30 starts a lane change.

Note that herein, "start of a lane change" is used as a phrase meaning start of the lane change control. During a period from when the lane change control is started until a vehicle behavior that causes the own vehicle 1 to perform a lane change occurs, a delay time due to various types of calculation or operation of the actuator exists.

When the lane change of the own vehicle 1 is started, the lane change state calculation unit 30 sets a switching flag from off to on in order to switch information about lane width that is used for calculation of a lateral position (that is, a lateral direction position or a lane width direction position) of the own vehicle 1 or calculation of a target travel trajectory during lane change. When the switching flag is off, the lateral position and the target travel trajectory are calculated based on a captured image in which a front view of the own vehicle 1 is captured by the camera in the sensor 11. When the switching flag is on, the lateral position and the target travel trajectory are calculated based on second lane width information that is acquired from the three-dimensional high-definition map information in the map database 13.

In addition, when the lane change of the own vehicle 1 is completed, the lane change state calculation unit 30 sets the switching flag from on to off. The lane change state calculation unit 30 outputs the switching flag to the lane information setting unit 31.

In addition, during lane change, the lane change state calculation unit 30 determines whether or not the own vehicle 1 crosses (goes over) a lane marking at a boundary between the first lane Le and the second lane Ln (hereinafter, sometimes referred to as a "boundary lane marking") and outputs a determination result to the lane information setting unit 31.

For example, the lane change state calculation unit 30 is capable of determining that the own vehicle 1 crosses the boundary lane marking, based on switching of a sign of a lateral position of the boundary lane marking with reference to the own vehicle 1. The lateral position of the boundary lane marking can be obtained through, for example, recognition of the lane marking from a captured image in which a front view of the own vehicle 1 is captured by the camera and calculation based on the position of the lane marking in the captured image and an optical condition of the camera.

The lane information setting unit 31 calculates a lateral position of the lane marking with reference to the own vehicle 1 by recognizing lane markings on both sides of the own vehicle lane from a captured image in which a front view of the own vehicle 1 is captured by the camera in the sensor 11. That is, the lane information setting unit 31, when the own vehicle 1 is traveling in the first lane Le, calculates lateral positions of lane markings of the first lane Le and, when the own vehicle 1 is traveling in the second lane Ln, calculates lateral positions of lane markings of the second lane Ln.

The lane information setting unit 31, for example, calculates the lateral positions of the lane markings, based on the positions of the lane markings in the captured image and an optical condition of the camera. The lane information setting unit 31 outputs lane marking information that is information relating to the recognized lane markings to the own vehicle position calculation unit 32 and the target trajectory calculation unit 33.

The lane marking information includes at least information about the calculated lateral positions of the lane markings. In the following description, the lateral position with reference to the own vehicle 1 of the lane marking on the left-hand side of the own vehicle 1 is referred to as a "lateral position yL", and the lateral position of the lane marking on the right-hand side of the own vehicle 1 is referred to as a "lateral position yR".

Further, the lane information setting unit 31 acquires first lane width information we that is information about lane width of the own vehicle lane, from a captured image in which a front view of the own vehicle 1 is captured by the camera in the sensor 11. That is, the lane information setting unit 31, when the own vehicle 1 is traveling in the first lane Le, acquires information about lane width of the first lane Le as the first lane width information we and, when the own vehicle 1 is traveling in the second lane Ln, acquires information about lane width of the second lane Ln as the first lane width information we.

For example, the lane information setting unit 31 may directly calculate the first lane width information we, based on the positions in the captured image of the lane markings on the left-hand side and right-hand side of the own vehicle lane and an optical condition of the camera, or may directly calculate the first lane width information we from the lateral positions yL and yR of the lane markings on the left-hand side and right-hand side of the own vehicle lane that are calculated as described above.

Further, when the lane change of the own vehicle 1 is started, the lane information setting unit 31 acquires (reads out) second lane width information wine that is information about the lane width of the first lane Le in which the own vehicle 1 is currently traveling and second lane width information wmn that is information about the lane width of the second lane Ln that is a target of the lane change, from the three-dimensional high-definition map information in the map database 13, based on the current position of the own vehicle 1 that the positioning device 12 detected. For example, the lane information setting unit 31 acquires the second lane width information wine and wmn from the three-dimensional high-definition map information, based on the current position of the own vehicle 1 in an extending direction of the first lane Le and the second lane Ln.

In the following description, the second lane width information wine and wmn are sometimes collectively referred to as "second lane width information win".

Before the lane change of the own vehicle 1 is started or after the lane change is completed, the lane information setting unit 31 outputs the first lane width information we acquired from the camera to the own vehicle position calculation unit 32 and the target trajectory calculation unit 33. The lane width information that is output from the lane information setting unit 31 to the own vehicle position calculation unit 32 and the target trajectory calculation unit 33 is referred to as "lane width output wo".

Note that herein, "before the lane change is started" is used as a phrase meaning an arbitrary time point before a start time point of the lane change control. Note that herein, "after the lane change is completed" is used as a phrase meaning an arbitrary time point after a completion time point of the lane change control. That is, each of "before the lane change is started" and "after the lane change is completed" may mean any time point in a period from a time point when the lane change control performed last time is completed to a time point when the next lane change control is started.

On the other hand, during lane change, the second lane width information wm is output to the the own vehicle position calculation unit 32 and the target trajectory calculation unit 33 as the lane width output wo.

For example, when the lane change is started, the lane information setting unit 31 switches the lane width output wo to be output to the own vehicle position calculation unit 32 and the target trajectory calculation unit 33 from the first lane width information we to the second lane width information win. For example, the lane information setting unit 31 may switch the lane width output wo from the first lane width information we to the second lane width information wm at a time point when the controller 20 starts the lane change control, or may switch the lane width output wo from the first lane width information we to the second lane width information wm at a time point after the controller 20 started the lane change control and before the own vehicle position calculation unit 32 and the target trajectory calculation unit 33 calculate an own vehicle position and a target trajectory, respectively.

In addition, for example, when the lane change is completed, the lane information setting unit 31 switches the lane width output wo from the second lane width information wm to the first lane width information we. For example, the lane information setting unit 31 may switch the lane width output wo from the second lane width information wm to the first lane width information we when the own vehicle 1 has reached an end point Pe that is a target position for the own vehicle 1 within the second lane Ln after the lane change is completed. For example, the end point Pe may be set to the lane center of the second lane Ln.

In addition, for example, the lane information setting unit 31 may switch the lane width output wo from the second lane width information wm to the first lane width information we at a time point before the lane change is completed (for example, at a time point when the own vehicle 1 has reached a vicinity of the end point Pe).

In this configuration, the vicinity of the end point Pe may be set to, for example, a position at which the first lane width information we with a high precision can be acquired from a captured image captured by the camera. For example, the vicinity of the end point Pe may be a position at which the lane markings on both sides of the second lane Ln fall within an angle of view of the camera (that is, a position at which the lane markings on both sides can be recognized from a captured image).

In addition, for example, when a lateral movement amount from a start point Ps that is a point at which the lane change is started to the end point Pe is defined as a lateral movement amount ytrg, a position at which lateral movement across a certain ratio (for example, 95%) of the lateral movement amount ytrg is completed may be defined as the vicinity of the end point Pe. In addition, for example, the vicinity of the end point Pe may be a lateral position a predetermined distance short of the end point Pe.

The lane information setting unit 31 may gradually change the lane width output wo when switching the lane width output wo between the second lane width information wm and the first lane width information we.

For example, when the own vehicle 1 starts the lane change, the lane information setting unit 31 may set, as the lane width output wo, a weighted sum expressed by the equation (1) below by use of a weighting coefficient K1 that has a value of 0 or more and 1 or less, and increase K1 from 0 to 1 at a first switching speed.

$$wo = K1 \times wme + (1 - K1) \times wc \qquad (1)$$

For example, when the own vehicle 1 is to complete the lane change, the lane information setting unit 31 may set, as the lane width output wo, a weighted sum expressed by the equation (2) below by use of a weighting coefficient K2 that has a value of 0 or more and 1 or less, and decrease K2 from 1 to 0 at a second switching speed.

$$wo = K2 \times wmn + (1 - K2) \times wc \qquad (2)$$

Note that the second switching speed may be lower than the first switching speed or the same as the first switching speed.

The own vehicle position calculation unit 32 calculates a lateral position ycr of the own vehicle 1 in the own vehicle lane as an own vehicle position, based on the lane marking information and the lane width output wo output from the lane information setting unit 31.

The own vehicle position calculation unit 32 calculates the own vehicle position ycr, based on a lateral position of one of the lane markings on the left-hand side and right-hand side and the lane width output wo (that is, the first lane width information we) before the lane change is started and after the lane change is completed. For example, in the lane-keeping control, the own vehicle position calculation unit 32 calculates the own vehicle position ycr, based on a lateral position of one of the lane markings on the left-hand side and right-hand side and the first lane width information we.

For example, the own vehicle position calculation unit 32 may calculate the own vehicle position ycr, based on a lateral position of one of the lane markings on the left-hand side and right-hand side that is closer to the own vehicle 1 and the first lane width information we.

For example, when the own vehicle position ycr is calculated based on the lane marking on the left-hand side, the own vehicle position calculation unit 32 may calculate the own vehicle position ycr, based on the equation (3) below and assuming that the central position of the own vehicle lane with reference to the current position of the own vehicle 1 is the own vehicle position ycr.

$$ycr = 0.5 \times wc + yL \qquad (3)$$

In addition, for example, when the own vehicle position ycr is calculated based on the lane marking on the right-hand side, the own vehicle position calculation unit 32 may calculate the own vehicle position ycr, based on the equation (4) below.

$$ycr = -0.5 \times wc + yR \qquad (4)$$

Next, while the lane change is performed, the own vehicle position calculation unit 32 calculates the own vehicle position ycr, based on the lateral position of the boundary lane marking between the first lane Le and the second lane Ln and the lane width outputs wo (that is, the second lane width information wine or wmn).

Figure 4:
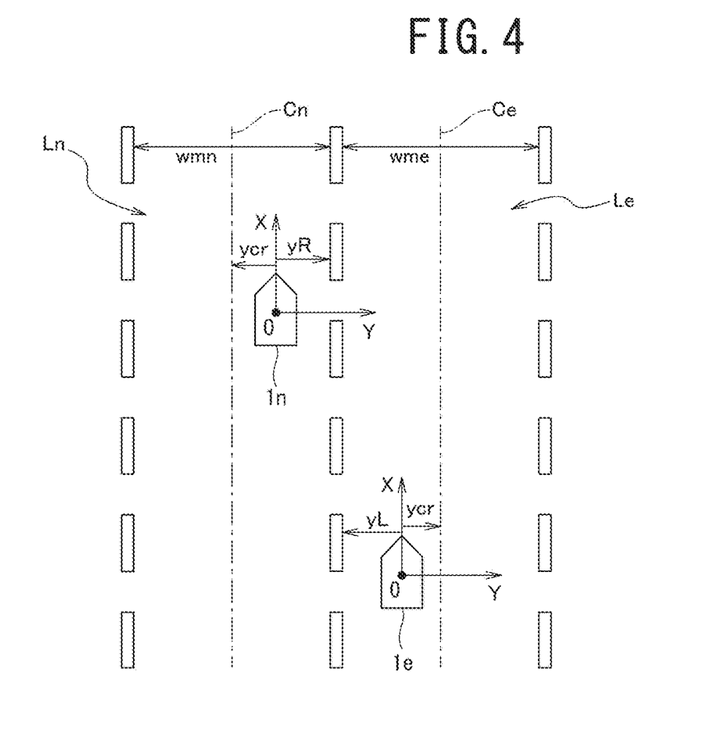
FIG. 4 is a schematic diagram of an example of a calculation method of an own vehicle position during lane change.

FIG. 4 is a schematic diagram of an example of a calculation method of the own vehicle position during lane change. A reference sign 1e indicates the own vehicle 1 before crossing the boundary lane marking, and a reference sign In indicates the own vehicle 1 after having crossed the boundary lane marking.

Specifically, the own vehicle position calculation unit 32 calculates the own vehicle position ycr, based on the lateral position of the boundary lane marking and the second lane width information wine of the first lane Le before the own vehicle 1 crosses the boundary lane marking and based on the lateral position of the boundary lane marking and the second lane width information wmn of the second lane Ln after the own vehicle 1 crossed the boundary lane marking.

For example, as illustrated in FIG. 4, when the second lane Ln after lane change is a left-hand lane of the first lane Le, the own vehicle position calculation unit 32 calculates the own vehicle position ycr, based on the equation (5) below before the own vehicle 1 crosses the boundary lane marking.

$$ycr = 0.5 \times wme + yL \qquad (5)$$

The own vehicle position calculation unit 32 calculates the own vehicle position ycr, based on the equation (6) below after the own vehicle 1 crossed the boundary lane marking.

$$ycr = -0.5 \times wmn + yR \qquad (6)$$

In addition, for example, when the second lane Ln after lane change is a right-hand side lane of the first lane Le, the own vehicle position calculation unit 32 calculates the own vehicle position ycr, based on the equation (7) below before the own vehicle 1 crosses the boundary lane marking.

$$ycr = -0.5 \times wme + yR \qquad (7)$$

The own vehicle position calculation unit 32 calculates the own vehicle position ycr, based on the equation (8) below after the own vehicle 1 crossed the boundary lane marking.

$$ycr = 0.5 \times wmn + yL \qquad (8)$$

The own vehicle position calculation unit 32 outputs the calculated own vehicle position ycr to the yaw angle control unit 34.

The target trajectory calculation unit 33 calculates a target travel trajectory that is a travel trajectory serving as a target trajectory that the own vehicle 1 is caused to travel.

For example, when the lane-keeping control is performed, the target trajectory calculation unit 33 generates, as a target travel trajectory, a trajectory that maintains a predetermined lateral position in the own vehicle lane. For example, the target trajectory calculation unit 33 may calculate a target travel trajectory that maintains the lateral position at the central position of the own vehicle lane.

For example, the target trajectory calculation unit 33 may calculate a target travel trajectory that maintains the lateral position at a center position Ce of the first lane Le before the lane change is started, and may calculate a target travel trajectory that maintains the lateral position at a center position Cn of the second lane Ln after the lane change is completed.

On the other hand, for example, when the target trajectory calculation unit 33 calculates a target travel trajectory in the lane change control, the target trajectory calculation unit 33 sets a lateral movement amount ytrg from the start point Ps to the end point Pe of the lane change, based on the lane width output wo and the own vehicle position ycr.

Figure 5:
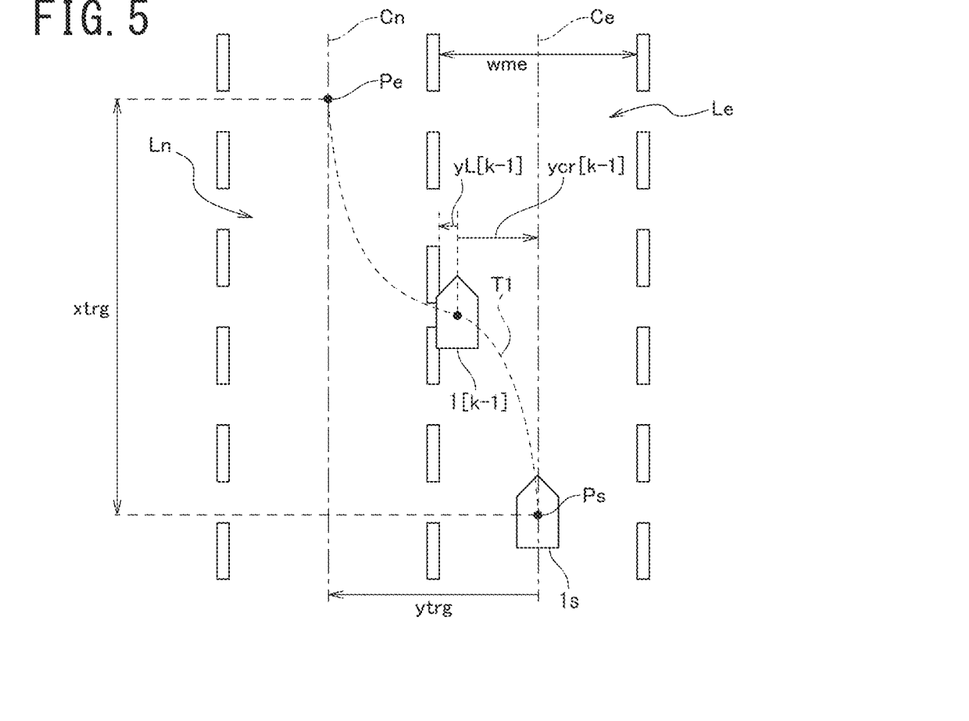
FIG. 5 is a schematic diagram of an example of a calculation method of a target travel trajectory during lane change.
Figure 6:
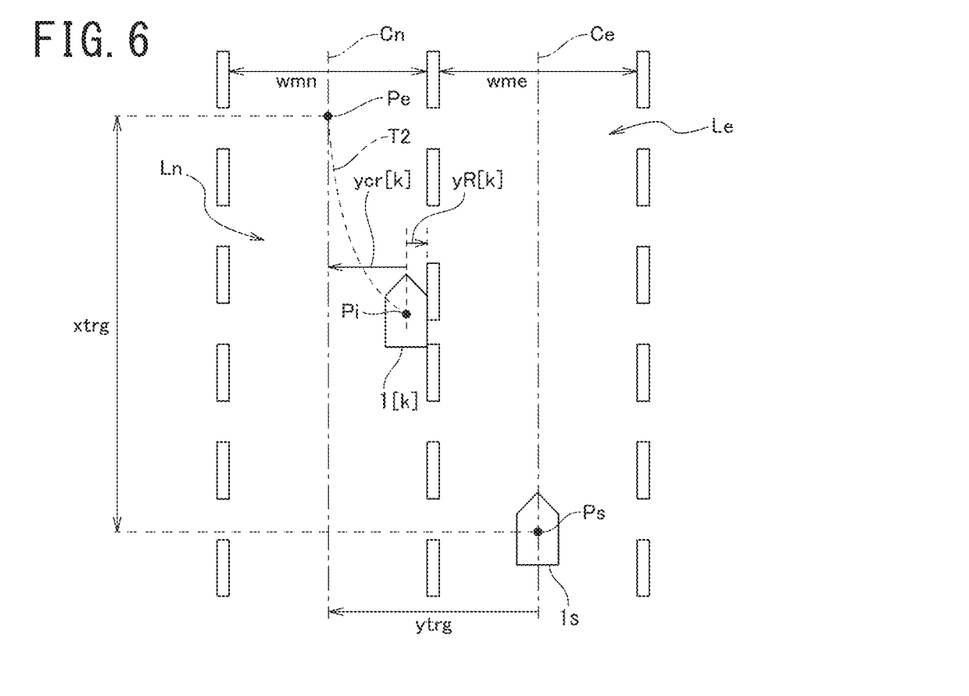
FIG. 6 is another schematic diagram of the example of the calculation method of the target travel trajectory during lane change.

FIGS. 5 and 6 are schematic diagrams of an example of a calculation method of a target travel trajectory during lane change.

The target trajectory calculation unit 33 sets a lateral movement amount ytrg expressed by the equation (9) below, based on the lane width output wo (that is, the second lane width information wine), when a lane change is started.

$$ytrg = wo \quad (9)$$

Note that when the lane width output wo is gradually changed, the target trajectory calculation unit 33 may gradually change the lateral movement amount ytrg by calculating the lane width output wo, based on the equation (1) described above.

In addition, the target trajectory calculation unit 33 sets a vertical movement amount xtrg from the start point Ps to the end point Pe, based on the lateral movement amount ytrg and vehicle speed V of the own vehicle 1. For example, the larger the lateral movement amount ytrg is, the larger vertical movement amount xtrg the target trajectory calculation unit 33 may set, and the higher the vehicle speed V is, the larger vertical movement amount xtrg the target trajectory calculation unit 33 may set. Note that in FIGS. 5 and 6, a reference sign is indicates the own vehicle 1 that is positioned at the start point Ps.

The target trajectory calculation unit 33 calculates an end point Pe, based on the set lateral movement amount ytrg and vertical movement amount xtrg and the start point Ps of the lane change.

The target trajectory calculation unit 33 sets a curved line linking the start point Ps and the end point Pe as a target travel trajectory T1. For example, the target trajectory calculation unit 33 may set a clothoid curve linking the start point Ps and the end point Pe as the target travel trajectory T1. For example, the target trajectory calculation unit 33 may define the target travel trajectory T1 as a profile of a movement amount in the lateral direction with respect to a movement amount in the extending direction of the lane.

During lateral movement in the lane change, the target trajectory calculation unit 33 may update the target travel trajectory T1 according to an actual travel position of the own vehicle 1. For example, the target trajectory calculation unit 33 calculates a remaining lateral movement amount yrem by subtracting a difference in the lateral position from the start point Ps to the current position of the own vehicle 1 from the lateral movement amount ytrg and calculates a remaining vertical movement amount xrem, based on the remaining lateral movement amount yrem and the vehicle speed V. The target trajectory calculation unit 33 updates the end point Pe, based on the lateral movement amount ytrg and the remaining vertical movement amount xrem and calculates a curved line linking the current position of the own vehicle 1 and the end point Pe after update as a target travel trajectory T1 after update.

Next, the target trajectory calculation unit 33 updates the lateral movement amount ytrg to a value calculated in accordance with the equation (10) below, at a timing when the own vehicle 1 crosses the boundary lane marking during lane change.

$$ytrg = ycr[k-1] - ycr[k] = 0.5 \times (wme + wmn) + (yL[k-1] - yR[k]) \quad (10)$$

In this equation, ycr[k−1] and yL[k−1] are an own vehicle position and a lateral position of the boundary lane marking, respectively, that were calculated in a control cycle immediately before the own vehicle 1 crossed the boundary lane marking as illustrated in FIG. 5, and ycr[k] and yR[k] are an own vehicle position and a lateral position of the boundary lane marking, respectively, that are calculated in a control cycle immediately after the own vehicle 1 crossed the boundary lane marking as illustrated in FIG. 6. A reference signs 1[k−1] and 1[k] indicate the own vehicle 1 immediately before crossing the boundary lane marking and the own vehicle 1 immediately after having crossed the boundary lane marking, respectively. As evident in the equation (10), the lateral movement amount ytrg is calculated as a difference between an own vehicle position cr immediately before the own vehicle 1 crosses the boundary lane marking and an own vehicle position cr immediately after the own vehicle 1 crossed the boundary lane marking.

The target trajectory calculation unit 33 calculates the remaining lateral movement amount yrem by subtracting a difference in the lateral position from the start point Ps to the current position of the own vehicle 1 from the lateral movement amount ytrg after update and calculates the remaining vertical movement amount xrem, based on the remaining lateral movement amount yrem and the vehicle speed V. The target trajectory calculation unit 33 updates the end point Pe, based on the lateral movement amount ytrg after update and the remaining vertical movement amount xrem and sets a curved line (for example, a clothoid curve) linking the current position of the own vehicle 1 and the end point Pe after update as a target travel trajectory T2.

During lateral movement after the own vehicle 1 crossed the boundary lane marking until immediately before the lane change is completed, the target trajectory calculation unit 33 may also update the target travel trajectory T2 according to an actual travel position of the own vehicle 1.

Instead of this configuration, the target trajectory calculation unit 33 may calculate the target travel trajectory T1 by setting the lateral movement amount ytrg, based on the equation (11) below when the lane change is started and does not have to update the lateral movement amount ytrg when the own vehicle 1 crosses the boundary lane marking.

$$ytrg = 0.5 \times (wme + wmn) \quad (11)$$

In the following description, the target travel trajectories T1 and T2 are sometimes collectively referred to as a "target travel trajectory T".

The target trajectory calculation unit 33 calculates a movement amount of the own vehicle in the extending direction of the lane, based on the vehicle speed V of the own vehicle 1 and calculates a target lateral position of the own vehicle 1 at a current time, based on the movement amount of the own vehicle 1 in the extending direction and the target travel trajectory T.

The target trajectory calculation unit 33 outputs the calculated target lateral position to the yaw angle control unit 34. While the lane-keeping control is performed, the target trajectory calculation unit 33 outputs a predetermined lateral position in the own vehicle lane as a target lateral position.

The yaw angle control unit 34 calculates a deviation of the own vehicle position ycr that the own vehicle position calculation unit 32 calculates with respect to the target lateral position that the target trajectory calculation unit 33 calculates and, by performing feedback control on the deviation, controls a yaw angle of the own vehicle 1 in such a way that the own vehicle 1 travels following the target travel trajectory T. For example, the yaw angle control unit 34 may control the yaw angle of the own vehicle 1 by outputting a steering instruction to the vehicle behavior control device 19 and thereby performing steering control of the own vehicle 1. In addition, for example, the yaw angle control unit 34 may control the yaw angle of the own vehicle 1 by generating a wheel speed difference between a right wheel and a left wheel through controlling operation of the drive mechanism and brake operation by the vehicle behavior control device 19.

(Operation)

FIGS. 7A to 7D are schematic diagrams illustrative of temporal variation of the switching flag of the lane width information, the lateral movement amount of the own vehicle, the own vehicle position cr, and the lane width output wo during lane change, respectively.

Figure 7A:
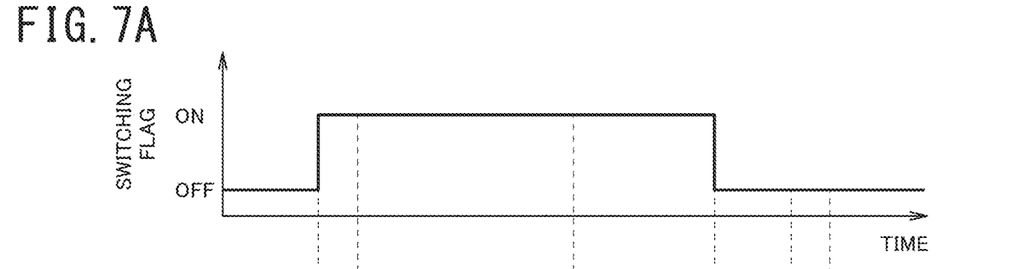
FIGS. 7A to 7D are schematic diagrams illustrative of temporal variation of a switching flag of lane width information, a lateral movement amount of an own vehicle, an own vehicle position, and output of lane width information from a lane information setting unit during lane change, respectively.
Figure 7B:
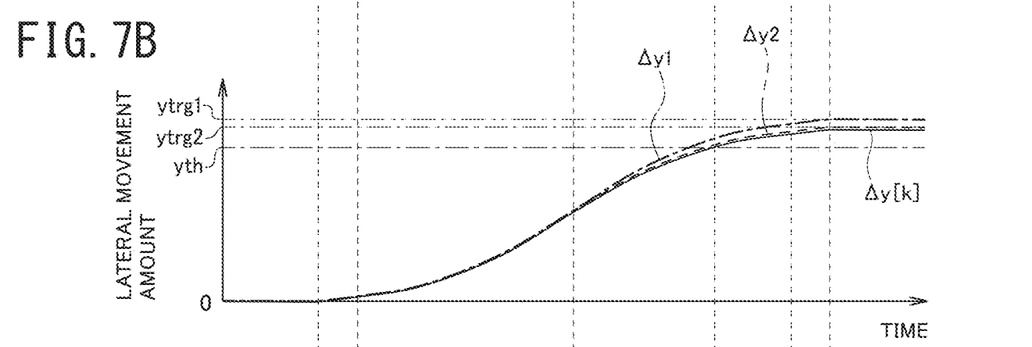

At time t1, the lane change state calculation unit 30 starts a lane change of the own vehicle 1. At a time before time t1, the lane-keeping control is performed and the lane change state calculation unit 30 sets the switching flag to off (FIG. 7A). The lane information setting unit 31 outputs the first lane width information we as the lane width output wo (FIG. 7D).

When the lane change is started at time t1, the lane change state calculation unit 30 sets the switching flag from off to on. In association with this effect, the lane information setting unit 31 gradually changes the lane width output wo at the first switching speed and changes the lane width output wo from the first lane width information we to the second lane width information wine over a period from time t1 to time t2. An interval between time t1 and time t2 may be, for example, 1 second.

In addition, at time t1, the target trajectory calculation unit 33 calculates a lateral movement amount ytrg in the lane change, based on the equation (9) described above and calculates a target travel trajectory T1, based on the lateral movement amount ytrg. The yaw angle control unit 34 controls the yaw angle of the own vehicle 1 in such a way that the own vehicle 1 travels following the target travel trajectory T1. As a result, as illustrated by the solid line in FIG. 7B, a lateral movement amount $\Delta y[k]$ of the own vehicle 1 increases. Ytrg1 on the ordinate indicates a lateral movement amount calculated based on the equation (9) described above, and the dashed-dotted line $\Delta y1$ indicates variation in the lateral movement amount of the target travel trajectory T1. The lateral movement amount $\Delta y[k]$ of the own vehicle 1 from time t1 to time t3 increases following a lateral movement amount $\Delta y1$ of the target travel trajectory T1.

Figure 7C:
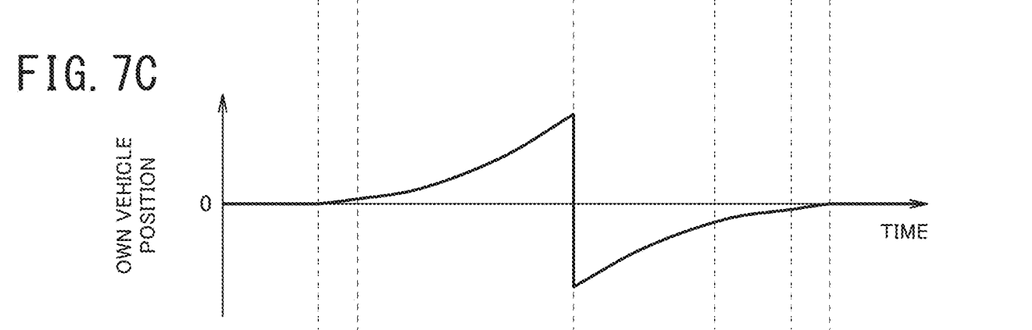
Figure 7D:
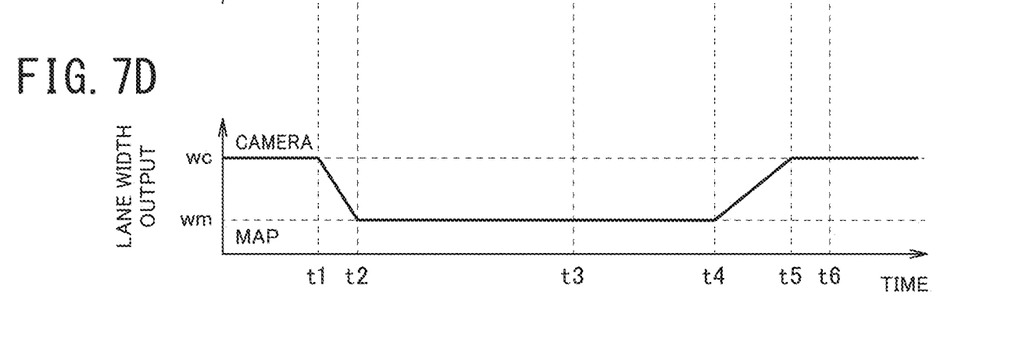

When the own vehicle 1 crosses the boundary lane marking at time t3, the own vehicle lane switching from the first lane Le to the second lane Ln causes the own vehicle position ycr to largely change, as illustrated in FIG. 7C.

The target trajectory calculation unit 33 calculates a lateral movement amount ytrg in the lane change, based on the equation (10) described above and calculates a target travel trajectory T2, based on the lateral movement amount ytrg. The yaw angle control unit 34 controls the yaw angle of the own vehicle 1 in such a way that the own vehicle 1 travels following the target travel trajectory T2.

Ytrg2 on the ordinate in FIG. 7B indicates a lateral movement amount calculated based on the equation (10) described above, and the broken line $\Delta y2$ indicates variation in the lateral movement amount of the target travel trajectory T2. The lateral movement amount $\Delta y[k]$ of the own vehicle 1 from time t3 to time t6 increases following a lateral movement amount $\Delta y2$ of the target travel trajectory T2.

When the own vehicle 1 reaches the vicinity of the end point Pe at time t4 and as illustrated in FIG. 7B, the lateral movement amount $\Delta y[k]$ of the own vehicle 1 reaches a threshold yth, the lane change state calculation unit 30 sets the switching flag from on to off (FIG. 7A). In association with this effect, the lane information setting unit 31 gradually changes the lane width output wo at the second switching speed and changes the lane width output wo from the second lane width information wmn to the first lane width information we over a period from time t4 to time t5 (FIG. 7D). An interval between time t4 and time t5 may be, for example, 1.5 seconds.

When the lateral movement amount Ay[k] of the own vehicle 1 reaches the lateral movement amount ytrg2 at time t6, lane change processing is completed. Subsequently, the lane-keeping control is performed.

Figure 8:
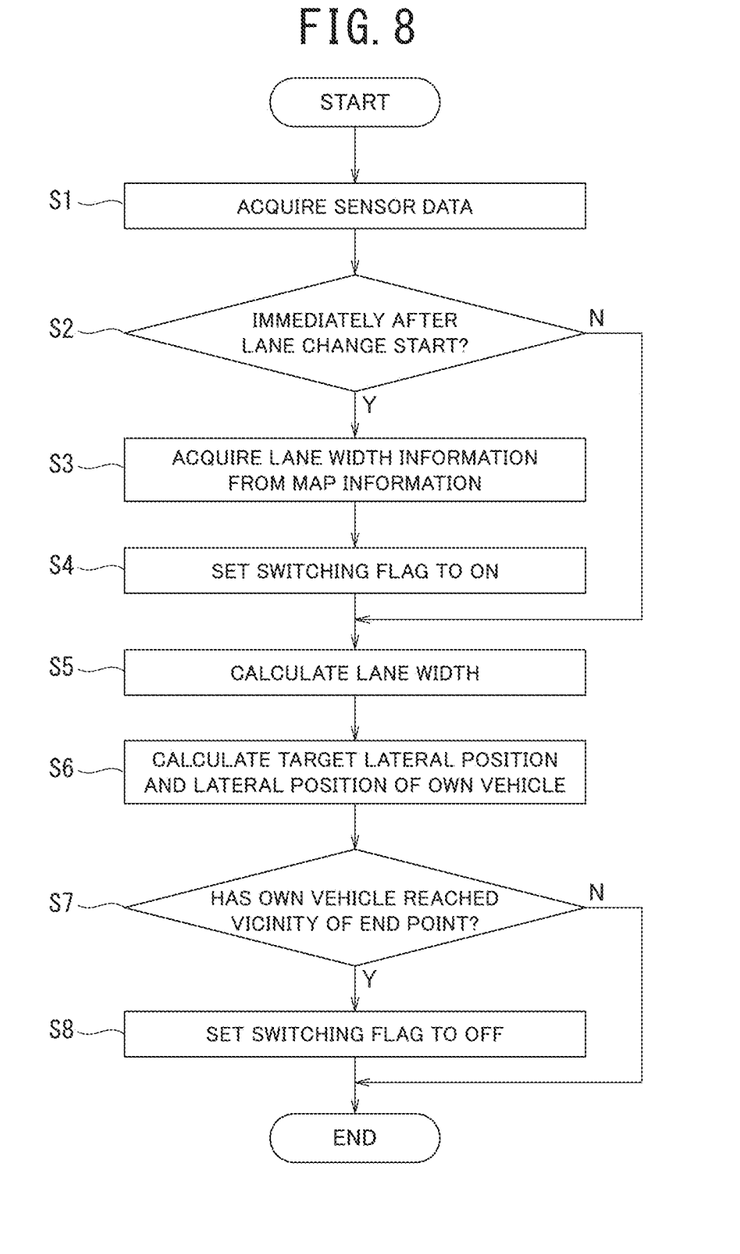
FIG. 8 is a flowchart of an example of control performed by the controller during lane change.

FIG. 8 is a flowchart of an example of control performed by the controller 20 during lane change. During lane change, the controller 20 repeatedly performs processing illustrated in FIG. 8 at a constant control period.

In step S1, the controller 20 acquires a captured image captured by a camera as data from the sensor 11.

In step S2, the controller 20 determines whether or not a current time is a time immediately after the lane change control is started. When the current time is a time immediately after the lane change control is started (step S2: Y), the process proceeds to step S3. When the current time is not a time immediately after the lane change control is started (step S2: N), the process proceeds to step S5.

In step S3, the controller 20 acquires second lane width information wm from the three-dimensional high-definition map information. In step S4, the controller 20 sets the switching flag from off to on.

In step S5, the controller 20 calculates lane width in accordance with the equation (1) described above. In step S6, the controller 20 calculates a target lateral position (that is, a lateral movement amount ytrg) and a lateral position of the own vehicle (that is, an own vehicle position cr), based on the lane width calculated in accordance with the equation (1) described above.

In step S7, the controller 20 determines whether or not the own vehicle 1 has reached a vicinity of an end point Pe. When the own vehicle 1 has reached the vicinity of the end point Pe (step S7: Y), the process proceeds to step S8. When the own vehicle 1 has not reached the vicinity of the end point Pe (step S7: N), the process terminates.

In step S8, the controller 20 sets the switching flag from off to on. Subsequently, the process terminates.

Advantageous Effects of Embodiment (1) The controller 20 executes processing including: before a lane change of the own vehicle 1 to an adjacent lane by autonomous driving is started, acquiring lane marking information in front of the own vehicle 1 and first lane width information, the first lane width information being information about lane width, from a camera and controlling a yaw angle of the own vehicle 1, based on the lane marking information and the first lane width information in such a way that the own vehicle 1 travels within an own vehicle lane; when the lane change is started, acquiring second lane width information, the second lane width information being information about the lane width, from map information and controlling the yaw angle, based on the second lane width information in such a way that the own vehicle 1 performs the lane change; and after the lane change is completed, controlling the yaw angle, based on the lane marking information and the first lane width information in such a way that the own vehicle 1 travels within an own vehicle lane after lane change. Because of this configuration, even when there is error in the lane width information from the camera, there is no possibility that the lane width before lane change is falsely recognized, which enables a trajectory at the time of lane change to be stabilized.

(2) When the lane change is started, the controller 20 may switch the information about lane width used for control of the yaw angle from the first lane width information to the second lane width information. Because of this configuration, even when there is error in the lane width information acquired from the camera when the lane change is started, it is possible to suppress unintended lateral movement from occurring.

(3) Before the lane change is completed, the controller 20 may switch the information about lane width used for control of the yaw angle from the second lane width information to the first lane width information. Because of this configuration, it is possible to quickly make use of the first lane width information when the first lane width information with high precision becomes acquirable from a captured image captured by the camera.

(4) The controller 20 may, when starting the lane change, switch information about lane width used for control of the yaw angle from the first lane width information to the second lane width information by gradually changing the information about the lane width at a first switching speed, and when completing the lane change, switch information about the lane width used for control of the yaw angle from the second lane width information to the first lane width information by gradually changing the information about the lane width at a second switching speed lower than the first switching speed. Because of this configuration, it is possible to suppress variation of vehicle behavior associated with the switching of the lane width information at a point immediately before the completion of the lane change.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
10 Driving assistance device
11 Sensor
12 Positioning device
13 Map DB
14 In-vehicle device
15 Navigation system
16 Display device
17 Sound output device
18 Input device
19 Vehicle behavior control device
20 Controller
21 Processor
22 Storage device

The invention claimed is:

1. A vehicle control method causing a controller to execute processing, the method comprising:
 before a lane change of an own vehicle from a first lane to a second lane adjacent to the first lane by autonomous driving is started, acquiring lane marking information in front of the own vehicle and first lane width information, the first lane width information being information about lane width, from a camera and controlling a yaw angle of the own vehicle, based on the lane marking information and the first lane width information of the first lane in such a way that the own vehicle travels within an own vehicle lane;
 as the lane change is started, acquiring second lane width information, the second lane width information being information about lane width of the first lane and lane width of the second lane, from map information before the own vehicle crosses a lane marking of a boundary between the first lane and the second lane and controlling the yaw angle, based on the second lane width information in such a way that the own vehicle performs the lane change;
 as the lane change is started, switching information about lane width used for control of the yaw angle from the first lane width information to the second lane width information by gradually changing the information about the lane width at a first switching speed;
 as the lane change is completed, switching information about lane width used for control of the yaw angle from the second lane width information to the first lane width information by gradually changing the information about the lane width at a second switching speed lower than the first switching speed; and
 after the lane change is completed, controlling the yaw angle, based on the lane marking information and the first lane width information of the second lane in such a way that the own vehicle travels within an own vehicle lane after lane change.

2. The vehicle control method according to claim 1, further comprising:
 as the lane change is started, switching information about lane width used for control of the yaw angle from the first lane width information to the second lane width information by gradually changing the information about the lane width at a first switching speed; and
 as the lane change is completed, switching information about lane width used for control of the yaw angle from the second lane width information to the first lane width information by gradually changing the information about the lane width at a second switching speed lower than the first switching speed.

3. The vehicle control method according to claim 1, wherein the controller is configured to control the yaw angle based on the second lane width information of a first lane on which the own vehicle travels before the lane change and the second lane width information of a second lane on which the own vehicle travels after the lane change.

4. The vehicle control method according to claim 3, wherein the controller is configured to control the yaw angle based on the second lane width information of the first lane before the own vehicle crosses a lane marking between the first lane and the second lane and control the yaw angle based on the second lane width information of the second lane after the own vehicle crosses the lane marking.

5. The vehicle control method according to claim 1, wherein the controller is configured to set a lateral movement amount of the own vehicle to an end point of the lane change based on the second lane width information.

6. The vehicle control method according to claim 1, wherein the controller is configured to generate a target travel trajectory based on the second lane width information and perform the lane change based on the target travel trajectory.

\* \* \* \* \*